United States Patent [19]

Butte et al.

[11] 4,413,307

[45] Nov. 1, 1983

[54] BUS BAR EXTENSIONS TO OUTSIDE OF BUSWAY FOR EXTERNAL CONNECTIONS

[76] Inventors: Joseph A. Butte, 79 Monte Vista Ave., Watsonville, Calif. 95076; Robert C. Foehn, 139 Lincoln Ave., Sausalito, Calif. 95965; Conrad C. Grieder, 423 Tehema St., San Francisco, Calif. 94103

[21] Appl. No.: 281,583

[22] Filed: Jul. 9, 1981

[51] Int. Cl.³ ............................................. H02B 1/20
[52] U.S. Cl. ................................... 361/378; 361/357; 174/49; 174/100
[58] Field of Search ............... 361/341, 355, 361, 378, 361/332, 334, 342, 356, 357; 174/48, 49, 100, 156, 99 B

[56] References Cited

U.S. PATENT DOCUMENTS

| 2,124,269 | 7/1938 | Anderson et al. | 361/378 X |
| 2,345,033 | 3/1944 | Claybourn | 361/341 |
| 3,146,298 | 8/1964 | Ceglia | 174/100 X |

FOREIGN PATENT DOCUMENTS

| 276527 | 11/1969 | Fed. Rep. of Germany | 174/156 |
| 52-3190 | 1/1977 | Japan | 174/156 |
| 878647 | 10/1961 | United Kingdom | 174/99 B |

Primary Examiner—G. P. Tolin
Attorney, Agent, or Firm—Alfons Puishes

[57] ABSTRACT

Vertical bus bars conducting high amperage electric current extend inside a bus way in tall buildings, and feeder connections are on each floor to a local circuit. The improvement is that the feeder connections are entirely outside the bus way. Each feeder connection includes individual insulated lugs conductively and permanently secured to the respective bus bars and extending through slots in an insulating plate into a switch or circuit breaker and fuse box entirely outside the bus way. All connections to local circuits are made in the switch box or circuit breaker box outside the bus way thereby avoiding shorting in the bus way.

5 Claims, 5 Drawing Figures

BUS BAR EXTENSIONS TO OUTSIDE OF BUSWAY FOR EXTERNAL CONNECTIONS

STATE OF THE ARTS

Heretofore the connections of the local circuits to the bus bars were located within the bus ways containing the bus bars. When feeder connections shorted or burned out for any reason, the explosion-like action destroyed the bus bars along substantially the entire height of the bus way causing extensive damage to the busway and sometimes to the building, requiring expensive construction and other repair work.

The primary object of the invention is to prevent such extensive damage to the bus way or to the building by locating the entire feeder connection entirely outside the faceway.

Another object of the invention is to provide such feeder connection which can be connected, repaired, replaced and manipulated without entering or manipulating or connecting or disconnecting inside the bus way, thereby allowing safe installation and repairs without causing damage to the bus bars or bus way or to the building.

DETAILED DESCRIPTION

The bus way 1 is usually a metal casing of rectangular cross-section which extends the entire height of the building, such as a skyscraper. It contains a plurality of perpendicular bus bars 2 which conduct high amperage electric current.

At each floor of the building is a feeder connector box 3 for the local circuit indicated by wires 4.

Figure 4:
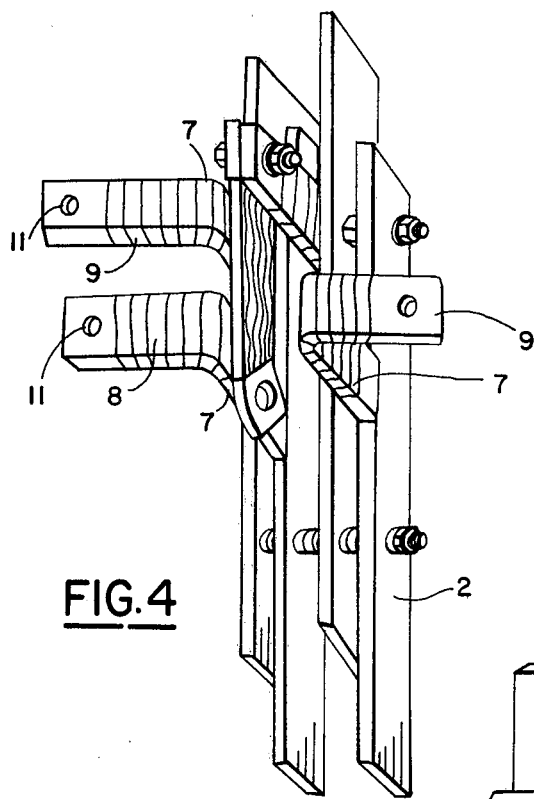
FIG. 4 is a fragmental view of the bus bars and the feeder connector lugs extending therefrom.
Figure 5:
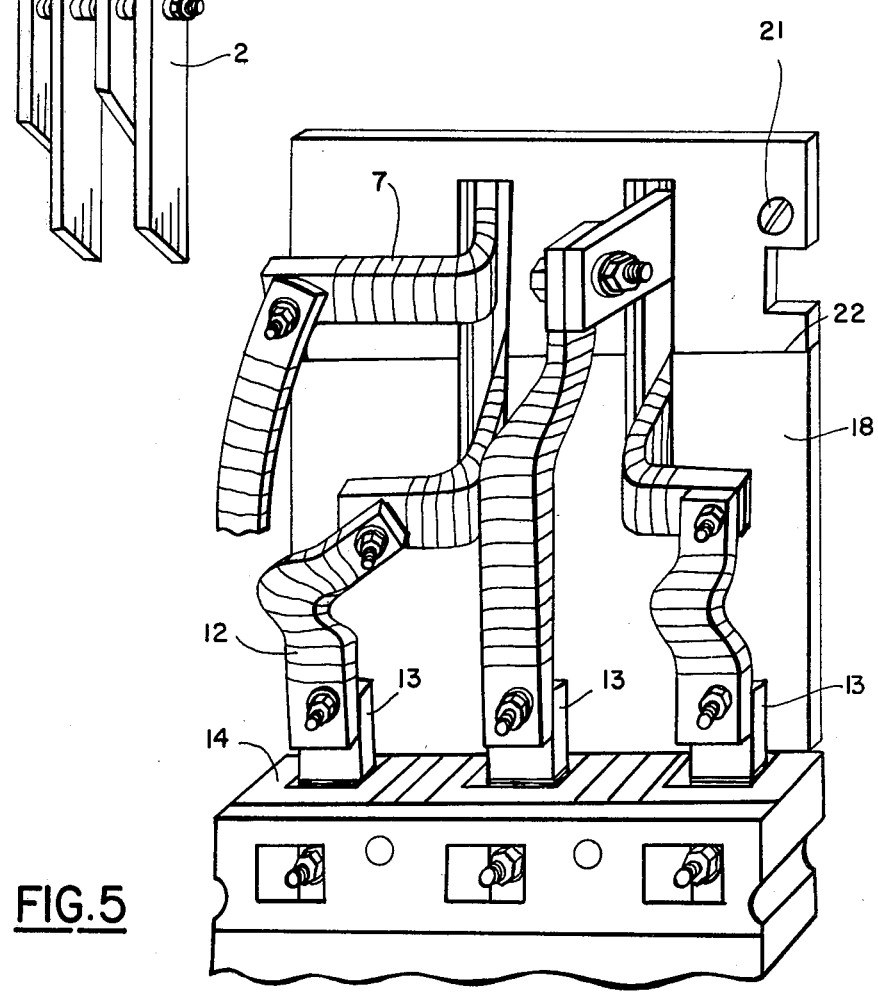
FIG. 5 is a perspective view of the feeder connector lugs connection to the fuse terminals.

FIGS. 4 and 5 show an individual feed connector lugs 7 conductively and permanently secured respectively to one of the bus bars 2, for instance by welding. Each connector lug 7 is covered with insulation 8. The outer end of each conductor lug 7 is formed for connection to a circuit breaker terminal. Some of the connector lugs 7 have a bent end 9 with a bolt hole 11 in it. Each lug 7 has a flexible conductor 12 on its end with bolt holes in its ends for bolting to the end of the lug 7 at one end and to a lug terminal 13 of the circuit breaker 14 at its other end.

The bus way has a hole 15 at each connector box 3. The base or back wall 16 of the box 3 has a registering hole 17. The lugs 7 extend through said holes 15 and 17. The hole 17 is covered by a split insulating plate 18, the split portions 22 of which form complemental slots 19 through which extend the lugs 7. The insulating plate 18 is held in place by screws 21 after the slots are fitted over the lugs 7.

Figure 1:
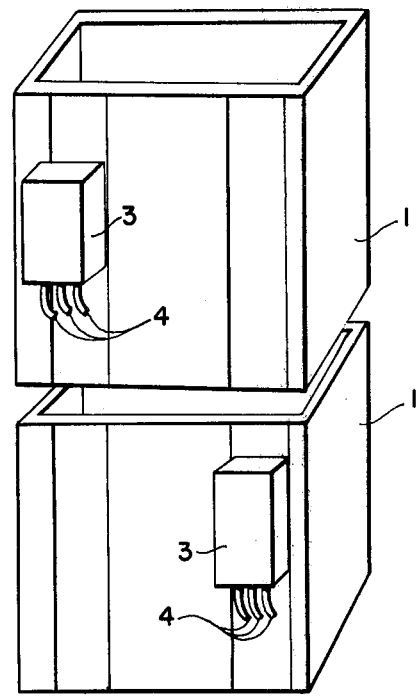
FIG. 1 is a fragmental view of a bus way illustrating the location of individual feeder connection assemblies for local circuits on different floors.
Figure 2:
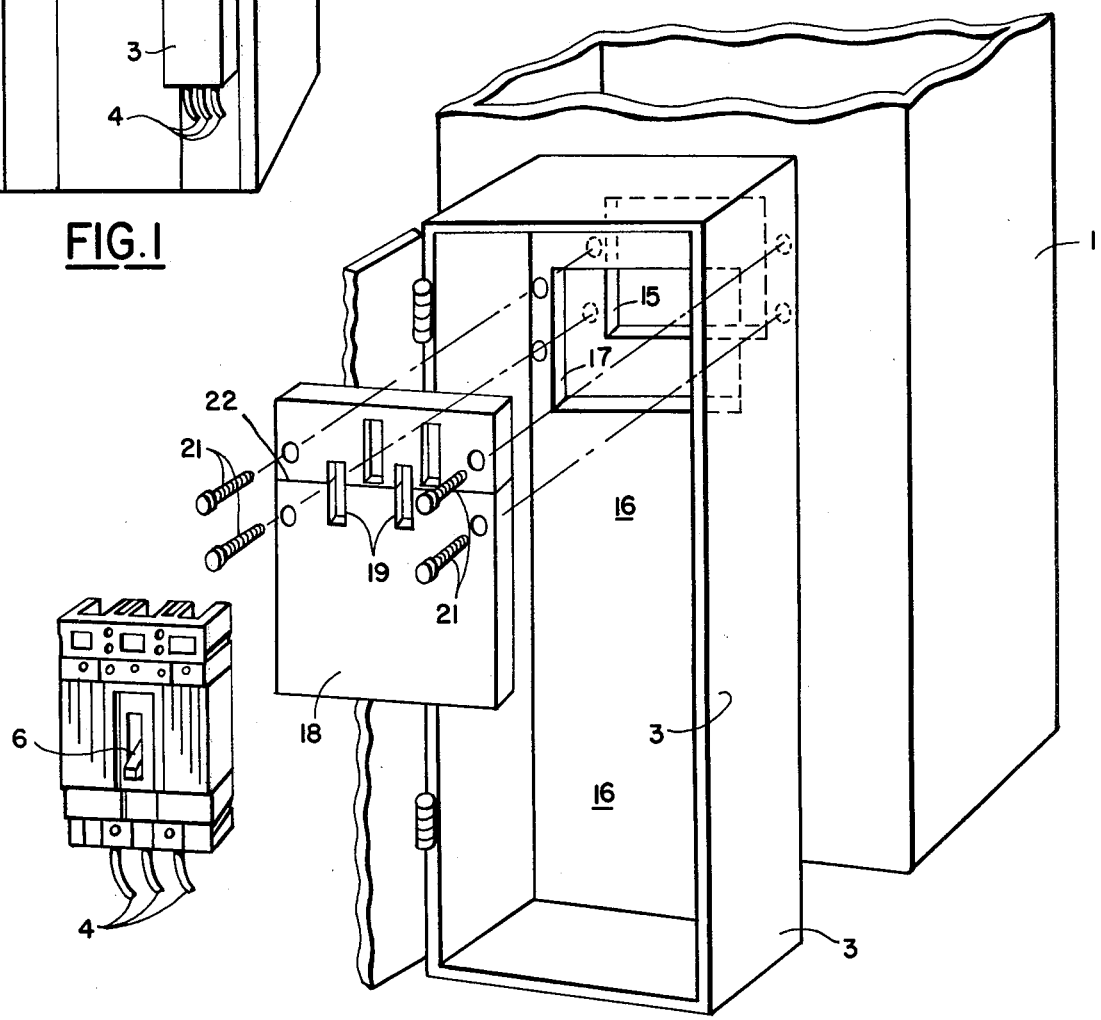
FIG. 2 is a perspective developed view of the feeder connector box and its contents relative to the bus way.
Figure 3:
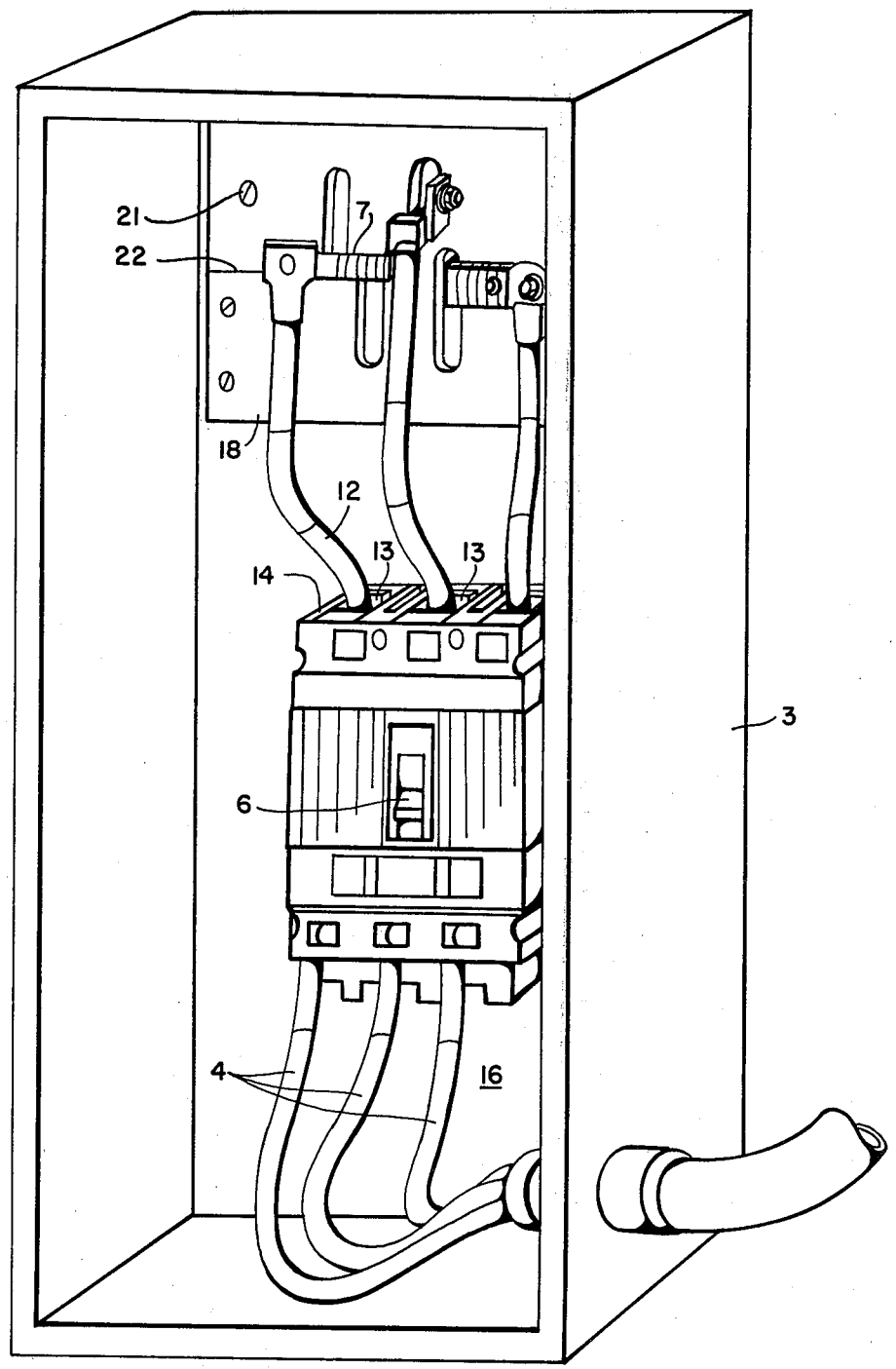
FIG. 3 is a perspective view of the feeder connector box and its contents.

The illustrative embodiment of the contents of the connector box 3 is shown in FIG. 3. The local circuit wires 4 enter through the bottom of the box 3 and are connected to local circuit terminals in the circuit breaker 14, or fuses not shown.

We claim:

1. In combination with a busway in a building and a plurality of bus bars within and along the height of the busway, local circuits on spaced floors of said buildings, and a hole through a side of said busway at each local circuit,
   a feeder connection between each local circuit and said busses comprising:
   a local circuit breaker box at each hole,
   the wall of each side box adjacent said busway having a hole substantially corresponding to one of the holes in the side of the busway,
   a circuit breaker in one of said box,
   each said feeder connection comprising connecting lugs having one end welded to each of said bus bars thus becoming an integral part thereof,
   the opposite end of said of said lugs protruding through said busway into each said box through said holes and disposed for connection to said circuit breakers inside said box.

2. The combination specified in claim 1, and each said feeder connection including
   a connecting lug permanently secured to each bus and extending through said holes, each lug being completely insulated,
   means to connect each connecting lug to each said circuit breaker.

3. The combination specified in claim 1, and an insulator plate covering each said hole in each said box having individual slots to accomodate the respective lugs.

4. The combination specified in claim 1 and each lug being completely covered with insulation.

5. The combination covered in claim 3, and each said insulating plate being split transversely at said slots to enable the slots in the split portions to embrace said lugs, and
   means to detachably secure each said plate to each said box.

* * * * *